(No Model.)

J. P. BUCHHOLTZ.
VEHICLE SPRING.

No. 327,518. Patented Oct. 6, 1885.

Witnesses
W. W. Lech.

Inventor
John P. Buchholtz
By Jos. K. Shoemaker
Attorney

UNITED STATES PATENT OFFICE.

JOHN P. BUCHHOLTZ, OF PHILADELPHIA, PENNSYLVANIA.

VEHICLE-SPRING.

SPECIFICATION forming part of Letters Patent No. 327,518, dated October 6, 1885.

Application filed February 12, 1885. Serial No. 155,726. (No model.)

*To all whom it may concern:*

Be it known that I, JOHN P. BUCHHOLTZ, a citizen of the United States, residing at Philadelphia, in the county of Philadelphia and State of Pennsylvania, have invented certain new and useful Improvements in Vehicle-Springs; and I do hereby declare the following to be a full, clear, and exact description of the invention, reference being had to the accompanying drawings, which form part of this specification.

In that class of vehicles wherein the body is supported on springs which are connected at each end to "side bars," which in turn are connected to the axles at each end by means of additional springs affixed thereto, or in some cases attached directly to the axles, it has heretofore been customary to rigidly fasten the ends of the springs which sustain the body to the side bars by means of clips and boxes or equivalent fastening devices. Where the body is connected to the side bars in the manner just described any vertical or saltatory movement of the body must necessarily impose a torsional strain upon the side bars, resulting eventually in their being broken or in the loosening or breaking of the clips and bolts by means of which the side bars are secured in position.

My invention has relation to springs for side-bar vehicles, and has for its object the provision of means for so connecting the body of the vehicle to the side bars that any vertical or oscillating movement of the body will be communicated to the side bars wholly in a vertical direction, and will thereby avoid any twisting or torsional straining of the latter.

My invention consists in the peculiar construction, combination, and arrangement of parts hereinafter described, and specifically claimed.

Figure 1:
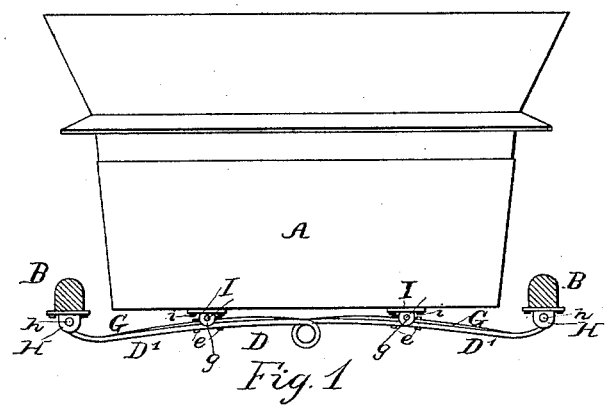
Figure 2:
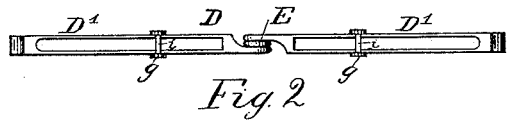
Figure 3:
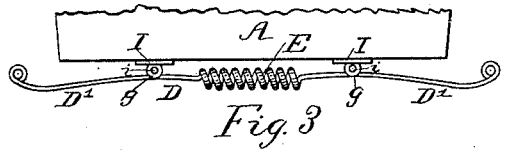
Figure 4:
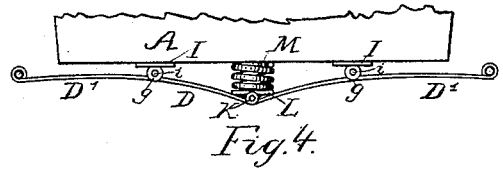
Figure 5:
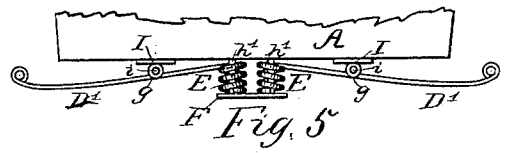
Figure 6:
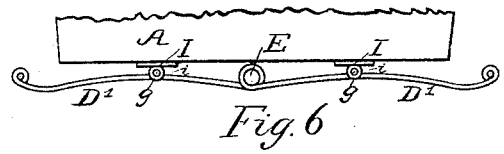

Referring to the accompanying drawings, Figure 1 is a rear elevation of the body of a vehicle having my improvements applied thereto, the side bars being in section; Fig. 2, a top view of my improved spring; Fig. 3, a similar view to Fig. 1, showing a slightly modified form of spring; Figs. 4, 5, and 6, further modifications.

A designates the body or box of the vehicle, which is of any desired form, and is constructed in the usual manner. B B designate the side bars, which are also of the ordinary and well-known form, and are secured at their ends either directly to the axles of the vehicle or to springs on top thereof. D designates my improved spring, which is secured to the side bars and to the body of the vehicle, as will be presently described, and forms the sole connection between the same. Two of these springs are employed, one at or near each end of the body of the vehicle. In the form which I prefer to employ this spring consists of two flat plates, D' D', having their ends bent upwardly and around to form eyes through which pass the bolts or pintles which secure the spring to the side bars, and a central spiral, E, which is formed integral with the two end plates, D' D'. In Fig. 1 of the drawings this spiral is so formed that its longitudinal axis is parallel with the side bars, while in Fig. 2 its axis is at right angles thereto. In Fig. 4 the two end plates, D' D', are separate pieces, and are hinged together at their inner ends, and the spiral E is also made separate, and is interposed between the inner ends of the plates D' D' and the bottom of the body. In Fig. 5 still another modification of my invention is shown, the plates D' D' having each a spiral, E, formed on its inner end, the two spirals being supported upon a plate, F, which is attached to the bottom of the vehicle by bolts *h' h'*. These several modified forms, while differing somewhat in their construction, all operate in substantially the same manner, and I therefore consider them all to be within the spirit of my invention. The end plates, D' D', may each consist of but a single thickness or a single plate of metal, upon which may be formed lugs for the purpose of attaching the springs to the body of the vehicle or, if thought necessary, an additional plate, G, may be secured on top of the plates D' by means of bolts *e e* and the lugs formed thereon. H H designate the boxes, which are secured to the side bars, B B, and serve to receive the ends of the plates D' D', pintles or bolts *h h* being passed through the eyes on the ends of the said plates and through the depending sides of the boxes, thereby securing these parts together. I I designate boxes, which are secured to the bottom of the body A by bolts *i i*, and are embraced by the lugs *g g* on the plates D' D', a bolt being passed through the box and the lugs and serving to pivotally attach the spring D to the body. In Fig. 4 the plates D' D' are separate pieces, and are hinged together by a bolt, K, which passes through eyes formed on their inner ends, and also serves to connect the said spring-plates to a round plate, L, upon the top of which is secured a spiral spring, M, attached at its upper end to the body A, as shown. Fig. 5 shows the two plates D' D', each formed with a spiral on its inner end, the two spirals being supported upon a plate, F, which is secured to the body A by bolts $h'$ $h'$. In the several modifications the manner of attaching the plates D' D' to the side bars and to the body is the same as in Fig. 1, and need not therefore be again described.

Operation: The springs D being attached to the side bars and to the body of the vehicle in the aforesaid manner, the weight of the body A bears upon the spring D at the points $i$ $i$. Now, if the spring D were of the ordinary semi-elliptical form any vertical movement of the body A would depress the spring at its center or between the points $i$ $i$, and thereby increase the distance between the bolts $h$ $h$, which secure the spring to the side bars, B B, and consequently twist the side bars more or less, according to the degree of descent of the body A. Where my improved spring is employed, the spiral at the center of the spring D permits of the inner ends of the plates D' D' approaching each other, and thereby avoiding the twisting or torsional straining of the side bars, the eyes on the outer ends of the plates D' D' turning slightly on the bolts $h$ $h$, and the strain upon the side bars being wholly in a vertical direction. The spiral at the center of the spring serves the further purpose of greatly increasing the resiliency of the springs D, and causes the vehicle-body to ride more easily than where the ordinary form of spring is used.

Having fully described my invention, I claim—

1. As a new article, a vehicle-spring consisting of two flat end plates connected together by a spiral, substantially as described.

2. A vehicle-spring consisting of a single plate of metal flattened at both ends and formed into a spiral at its center, substantially as described.

3. The combination, with a vehicle-body and side bars, of springs for connecting the two, said springs having flat end plates, which are attached to the side bars and to the body, and connected together at their inner ends by a spiral spring, substantially as described.

4. In a side-bar vehicle, the combination, with the body A and the side bars, B B, of the springs D, having the flat ends D' D', and the central spiral, E, said springs being connected at their outer ends to the side bars and at points between the outer ends and the spiral to the body, substantially as described.

In testimony that I claim the foregoing I have hereunto set my hand this 9th day of February, A. D. 1885.

JOHN P. BUCHHOLTZ.

Witnesses:
W. W. LEECH,
WM. McINTYRE.